US012618425B2

(12) United States Patent (10) Patent No.: US 12,618,425 B2
Braun (45) Date of Patent: May 5, 2026

(54) PNEUMATIC DRIVE DEVICE FOR TRANSLATIONAL AND/OR ROTATIONAL MOVEMENT

(71) Applicant: Tuebingen Scientific Medical GmbH, Tübingen (DE)

(72) Inventor: Marcus Braun, Weil im Schönbuch (DE)

(73) Assignee: Tuebingen Scientific Medical GmbH (DE)

( * ) Notice: Subject to any disclaimer, the term of this patent is extended or adjusted under 35 U.S.C. 154(b) by 0 days.

(21) Appl. No.: 18/853,150

(22) PCT Filed: Mar. 27, 2023

(86) PCT No.: PCT/EP2023/057843
§ 371 (c)(1),
(2) Date: Oct. 1, 2024

(87) PCT Pub. No.: WO2023/186807
PCT Pub. Date: Oct. 5, 2023

(65) Prior Publication Data
US 2025/0243883 A1 Jul. 31, 2025

(30) Foreign Application Priority Data
Apr. 1, 2022 (DE) ..................... 10 2022 107 857.4

(51) Int. Cl.
*F15B 15/06* (2006.01)
*F04B 43/02* (2006.01)
(Continued)

(52) U.S. Cl.
CPC .......... *F15B 15/063* (2013.01); *F04B 43/026* (2013.01); *F04B 45/043* (2013.01);
(Continued)

(58) Field of Classification Search
CPC . F15B 15/063; F15B 15/10; F16J 3/06; F04B 43/026; F04B 45/043
See application file for complete search history.

(56) References Cited

U.S. PATENT DOCUMENTS 2,465,560 A * 3/1949 Warnke ..................... F16J 10/02
92/92
2,623,361 A * 12/1952 Dungler .................. F15B 15/10
92/92
(Continued)

FOREIGN PATENT DOCUMENTS

DE 10117531 A1 * 10/2002 ............ F04B 43/026
DE 102016217198 A1 3/2018
(Continued)

OTHER PUBLICATIONS

German Search Report with English translation in corresponding DE Application No. 10 2022 107 857.4 dated Nov. 11, 2022, 12 pages.

(Continued)

*Primary Examiner* — Matthew Wiblin
(74) *Attorney, Agent, or Firm* — Buchanan Ingersoll & Rooney PC

(57) ABSTRACT

A pneumatic drive device includes a housing, a piston, and a first membrane. The first membrane and the piston are coupled to each other in such a way that an axial movement of the first membrane, caused by pressurizing a first pressure chamber, is converted into a translational movement of the piston. The pneumatic drive device also includes an output element, and a membrane. The membrane and the output element are coupled to each other in such a way that a circumferentially section-wise oscillating axial movement of the membrane, caused by circumferentially successive pressurization and depressurization of respective pressure
(Continued)

Figures 4, 5:
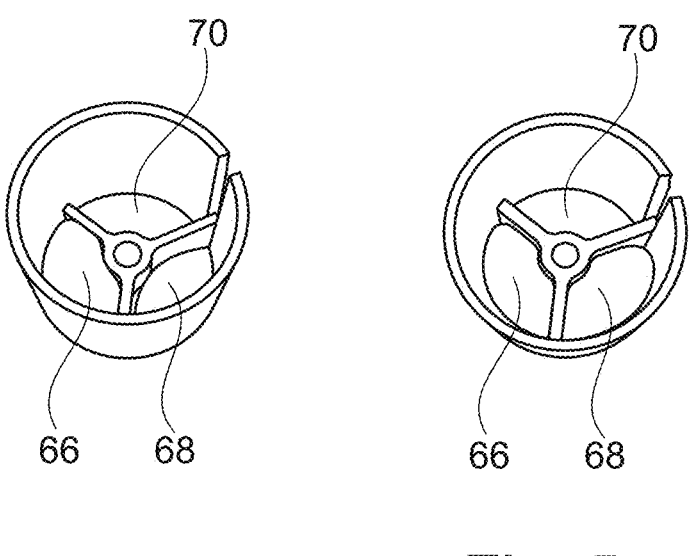

chambers, is converted into a rotational movement of the output element.

10 Claims, 2 Drawing Sheets

(51) Int. Cl.

| | |
|---|---|
| *F04B 45/04* | (2006.01) |
| *F15B 15/10* | (2006.01) |
| *F16J 3/06* | (2006.01) |
| *F15B 15/14* | (2006.01) |

(52) U.S. Cl.
CPC ................ *F15B 15/10* (2013.01); *F16J 3/06* (2013.01); *F15B 15/1447* (2013.01)

(56) References Cited

U.S. PATENT DOCUMENTS

| | | | |
|---|---|---|---|
| 3,884,238 A | | 5/1975 | Omalley et al. |
| 4,909,249 A | | 3/1990 | Akkas et al. |
| 5,367,943 A | * | 11/1994 | Stoll .......................... B25J 9/14 |
| | | | 91/61 |
| 2009/0018602 A1 | | 1/2009 | Mitelberg et al. |
| 2011/0184390 A1 | | 7/2011 | Zanni et al. |
| 2011/0270037 A1 | | 11/2011 | Soutorine |
| 2013/0211196 A1 | | 8/2013 | Belson et al. |
| 2018/0147013 A9 | | 5/2018 | Toledo-crow et al. |
| 2020/0367985 A1 | | 11/2020 | Penny et al. |
| 2022/0008146 A1 | | 1/2022 | Penny et al. |

FOREIGN PATENT DOCUMENTS

| | | | | |
|---|---|---|---|---|
| EP | 0464882 A1 | * | 1/1992 | .............. F04B 1/148 |
| EP | 1981416 A2 | | 10/2008 | |
| WO | WO-8302135 A1 | * | 6/1983 | .............. F15B 15/10 |
| WO | 2007092739 A2 | | 8/2007 | |
| WO | 2014155743 A1 | | 10/2014 | |

OTHER PUBLICATIONS

Hisatomi et al., "Development of Forceps Manipulator Using Pneumatic Soft Actuator for a Bending Joint of Forceps Tip", IEEE/SICE International Symposium on System Integration, Jan. 14, 2019, pp. 695-700.

International Search Report (PCT/ISA/210) and Written Opinion (PCT/ISA/237) mailed on Jun. 10, 2023, by the European Patent Office as the International Searching Authority for International Application No. PCT/EP2023/057843, 21 pages.

Kalisky et al., "Differential Pressure Control of 3D Printed Soft Fluidic Actuators", IEEE/RSJ International Conference on Intelligent Robots and Systems, Sep. 24, 2017, pp. 6207-6213.

Wang et al., "An Electrohydraulic Control Device With Decoupling Effect for Three-Chamber Soft Actuators", IEEE/ASME Transactions on Mechatronics, vol. 27, No. 3, Jun. 7, 2021, pp. 1683-1691.

* cited by examiner

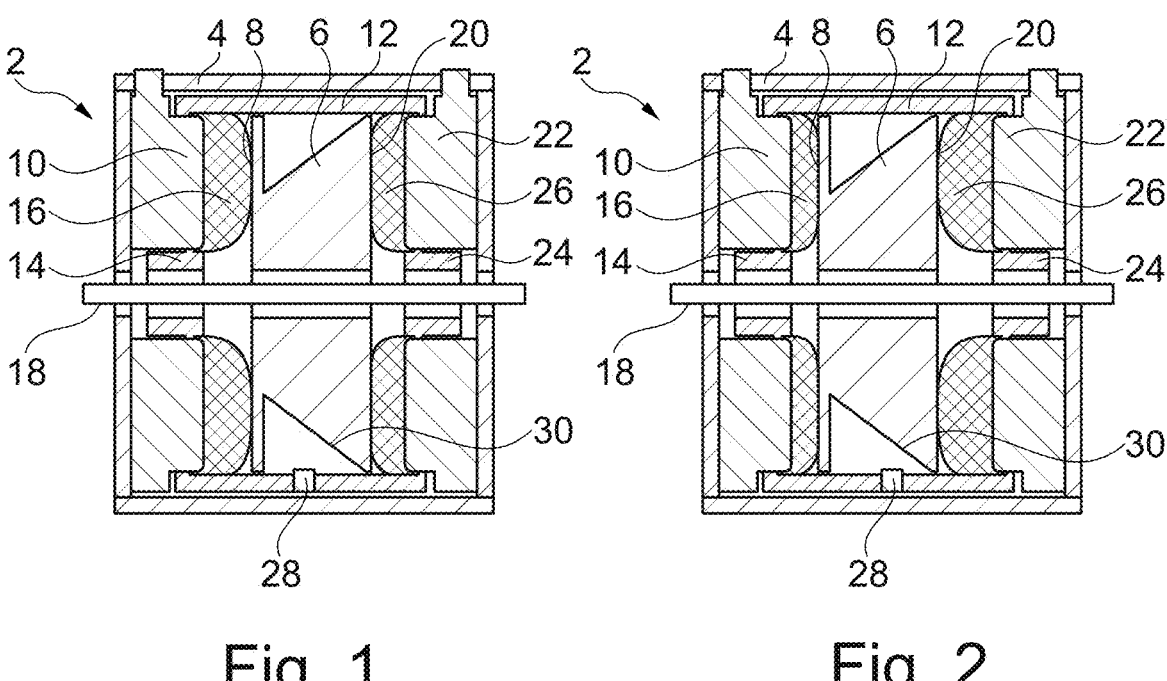
Fig. 1          Fig. 2
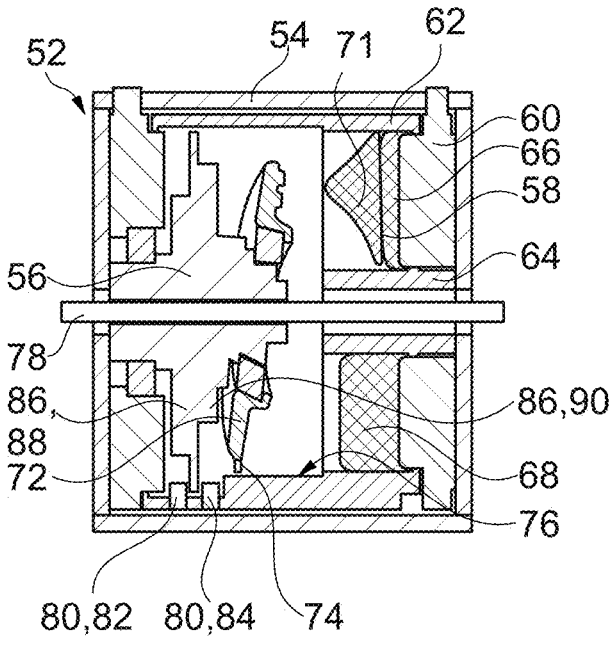
Fig. 3

PNEUMATIC DRIVE DEVICE FOR TRANSLATIONAL AND/OR ROTATIONAL MOVEMENT

CROSS REFERENCE TO RELATED APPLICATIONS

This U.S. Patent Application is a National Stage Patent Application in the United States claiming priority to PCT Patent Application No.: PCT/EP2023/057843 filed Mar. 27, 2023, which claims priority to German Patent Application Serial No.: 10 2022 107 857.4, filed Apr. 1, 2022, the contents of such applications being incorporated by reference herein in their entirety.

FIELD OF THE INVENTION

The present disclosure is directed to a pneumatic drive device for translational movement and/or for rotational movement of an actuator shaft of a medical instrument, in particular a minimally invasive instrument.

BACKGROUND OF THE INVENTION

For precisely moving the medical instrument and, in particular, for precisely actuation of the instrument as a result of the movement it is necessary to provide a drive device that can be precisely controlled.

Motor-driven drive devices are already known from the state of the art. These devices drive the instrument by means of an electric motor, either directly or via a suitable gearbox. However, the disadvantage of this is that sufficient space must be available for the electric motor, which is a problem especially in the field of minimally invasive surgery. For a direct drive, it must be possible to couple the electric motor directly to the instrument, which in turn requires spatial proximity. However, this creates further problems with regard to supplying the electric motor with power and, above all, sterility of the electric motor, as the electric motor is usually designed as a multi-use component for cost reasons. In the case of a drive in which the movement is transmitted to the instrument via a suitable gearbox, there is the additional problem that the force generated by the electric motor does not act proportionally to the movement of the instrument due to losses in the gearbox, which in turn affects the controllability of the drive device.

Further, pneumatic drive devices are already known form the state of the art. These devices drive the instrument by means of pressurizing a pressure chamber. The pressure chamber is formed by a piston sliding inside a cylinder. However, due to the necessary seal between the cylinder and the piston, friction occurs between them, resulting in the so-called "stick-slip effect", in which the piston starts moving abruptly (due to static friction) and in which the applied force does not act proportionally to the movement of the instrument. In addition, leakage can occur between the piston and the cylinder, which could cause compressed air to escape from the drive device in the immediate vicinity of the patient, which must be avoided for reasons of patient safety.

SUMMARY OF THE INVENTION

The gist of the present disclosure is that a piston to be moved does not define/limit the pressure chamber, for which the piston would have to be mounted in a (as far as possible) gas-tight manner to an inner wall of a housing/cylinder, but at the same time in a movable manner relative to the inner wall of the housing. In this case, the gas-tight mounting of the piston would necessarily cause a certain amount of friction between the piston and the housing, which in turn would affect the displaceability, i.e. the force required for the displacement, and in particular cause the stick-slip effect mentioned above. Thus, by providing an additional membrane for surrounding the pressure chamber in a gas-tight manner, on the one hand, the tightness of the pressure chamber as such can be better guaranteed (and thus, improving patient safety, in particular, ensuring sterility) and on the other hand, the piston can be accommodated in the housing almost frictionless, which means that the applied pressure is almost proportional to the generated movement, so that the drive device can be controlled extremely precisely. Further, a limitation of maximum forces is possible.

For avoiding the stick-slip effect during expansion/deflection of the membrane as far as possible, friction between the membrane and surfaces contacted by the membrane, such as the inner wall of the housing, must be prevented or reduced to avoid losses and thus, to ensure proportionality between pressure and movement, for example by selecting suitable materials for the membrane. In particular, the membrane may be made from a thermoplastic elastomer. Further, the membrane may preferably have good sliding properties on its outer side by choosing an adequate material or providing the membrane with an adequate coating. At the same time, the membrane should be designed in such a way that the reversible expansion/deflection of the membrane is possible, which can be achieved, for example, by a suitable choice of material, in particular with a high elasticity, i.e. an elasticity greater than 200%, preferably greater than 400%, or a corresponding geometrical design, in particular as a bellows/accordion, with axial zigzag folding, or the like.

According to a first aspect of the disclosure, there is a pneumatic drive device for translational movement of an actuator shaft of a medical instrument, in particular a minimally invasive instrument. The drive device comprises a housing. The housing may be preferably substantially cylindrical/tubular.

The drive device comprises a piston. The piston is mounted in the housing so as to be slidable/displaceable along a longitudinal axis of the piston. In particular, the piston may be axially movable within the housing. That is, the longitudinal axis of the piston may preferably correspond to an axial direction of the drive device/of the housing. A movement of the piston is configured to be coupled to a movement of the actuator shaft, preferably as a direct drive (without an additional gearbox for converting or translating the movement of the piston). Thus, the movement the piston causes the movement of the actuator shaft, in particular almost loss-free and with a direct/proportional feedback between applied pneumatic pressure and the movement generated thereby.

The drive device comprises a first membrane. The first membrane may be preferably elastically stretchable or expandable like an accordion. For example, the first membrane may be clamped/spanned onto a plate fixed to the housing. The first membrane is fixedly mounted in the housing. The first membrane defines a first pressure chamber. That is, the first pressure chamber is surrounded by the first membrane in a gas-tight manner. In particular, the first membrane and the housing exclusively (—in particular not the piston—) form the pressure chamber. The first membrane is enabled to be (reversibly) axially deflected by pressurizing the first pressure chamber. That is, by pressurization the first pressure chamber increases so that the first membrane, for example due to its material-related stretching and/or its geometry-related expandability, is caused to axially deflect. In particular, the expansion of the first membrane to one side may be limited/not possible, so that the first membrane expands/inflates specifically to another side (the side facing towards the piston). Further, that is, by depressurization the first pressure chamber decreases so that the first membrane returns to an original state of the first membrane and is caused to axially shrink. In particular, the first membrane reduces/deflates to the one side (the side facing away from the piston). Preferably, the deflection of the first membrane can be regulated continuously/steplessly.

According to the first aspect, the first membrane and the piston are coupled to each other in such a way that an axial movement of the first membrane, caused by pressurizing the first pressure chamber, is converted into a translational movement/displacement of the piston along the longitudinal direction of the piston. That is, the expansion/deflection of the first membrane causes the piston to move along the longitudinal direction of the piston, in particular by contacting/pushing/abutting the piston/exerting a compressing force on the piston. Since the pressurization of the first pressure chamber can be controlled proportionally, and therefore sensitively, and since the deflection of the first membrane and thus the translational movement of the piston is almost proportional to the pressure, the stroke of the piston can be controlled or regulated with particular precision, in particular increment-free, i.e. not in steps specified by the mechanical design.

According to a preferred embodiment, the first membrane may have a cross-section being substantially shaped as a (circular) ring, so that a through hole axially extends through the first membrane. That is, the first membrane is not formed in a central area, but surrounds this central area, preferably as a ring or one or several ring sections, or alternatively in another form. The ring may preferably be coaxial to a longitudinal axis of the piston. That is, that the central area (in which the first membrane is not formed) may be preferably centrally arranged with respect to the drive device/centrally around the longitudinal axis of the piston. Thus, components of the drive device can be passed through the first membrane, in particular to connect components arranged axially on both sides of the first membrane.

According to the preferred embodiment, the drive device may comprise a piston rod. The piston rod may be (fixedly) coupled to the piston, at least in the axial direction, and axially extend through the through hole through the first membrane. Thus, by the piston rod axially passing through the first membrane, the movement of the piston caused on one side of the first membrane can be transmitted to another side of the first membrane. This makes it possible to arrange several drive devices axially nested/behind each other.

According to a preferred embodiment, the first membrane and the piston may be unconnected/separate from each other. That is, the first membrane is not firmly connected to the piston, but only rests/abuts/lies against it. Otherwise, the first membrane would be weakened at the connection point to the piston, so that material failure/tearing of the first membrane could occur more easily. Further, the first membrane, when the first membrane is deflected, may contact the piston to push/displace the piston to a first side in the longitudinal direction of the piston. That is, due to the unconnectedness between the piston and the first membrane, there is only a pushing movement of the piston actuated by the first membrane and no pulling movement actuated by the first membrane. Thus, the first membrane can (only) move the piston in one direction/to the first side when pressure is applied/by pressurizing the first pressure chamber, because when the pressure is released/by depressurizing the first chamber, the first membrane retracts/moves backwards without causing the piston to move.

According to the preferred embodiment, the drive device may comprise a second membrane. The second membrane may be preferably arranged on a side of the piston being opposite to the first membrane. The second membrane may be analogous to the first membrane/have the same features as the first membrane. That is, the second membrane may be preferably elastically stretchable or expandable like an accordion. For example, the second membrane may be clamped/spanned onto a plate fixed to the housing. The second membrane is fixedly mounted in the housing. The second membrane defines a second pressure chamber. In particular, the second membrane and the housing exclusively (—in particular not the piston—) form the second pressure chamber. That is, the second pressure chamber is surrounded by the second membrane in a gas-tight manner. The second membrane is enabled to be (reversibly) axially deflected by pressurizing the second pressure chamber. That is, by pressurization the second pressure chamber increases so that the second membrane, for example due to its material-related stretching and/or its geometry-related expandability, is caused to axially deflect. In particular, the expansion of the second membrane to one side may be limited/not possible, so that the second membrane expands/inflates specifically to another side (the side facing towards the piston). Further, that is, by depressurization the second pressure chamber decreases so that the second membrane returns to an original state of the second membrane and is caused to axially shrink. In particular, the second membrane reduces/deflates to the one side (the side facing away from the piston). Preferably, the deflection of the second membrane can be regulated continuously/steplessly.

According to the preferred embodiment, the second membrane and the piston may be coupled to each other in such a way that an axial movement of the second membrane, caused by pressurizing the second pressure chamber, is converted into a translational movement/displacement of the piston along the longitudinal direction of the piston. That is, the expansion/deflection of the second membrane causes the piston to move along the longitudinal direction of the piston, in particular by contacting/pushing/abutting the piston/exerting a compressing force on the piston. Since the pressurization of the second pressure chamber can be controlled proportionally, and therefore sensitively, and since the deflection of the second membrane and thus the translational movement of the piston is almost proportional to the pressure, the stroke of the piston can be controlled or regulated with particular precision, in particular increment-free, i.e. not in steps specified by the mechanical design.

According to the preferred embodiment, the second membrane may have a cross-section being substantially shaped as a (circular) ring, so that a through hole axially extends through the second membrane. That is, the second membrane is not formed in a central area, but surrounds this central area, preferably as a ring or one or several ring sections, or alternatively in another form. The ring may preferably be coaxial, or substantially coaxial, to a longitudinal axis of the piston. That is, that the central area (in which the second membrane is not formed) may be preferably centrally arranged with respect to the drive device/centrally around the longitudinal axis of the piston. Thus, components of the drive device can be passed through the second membrane, in particular to connect components arranged axially on both sides of the second membrane.

According to the preferred embodiment, the piston rod may axially extend through the through hole through the second membrane. Thus, by the piston rod axially passing through the second membrane, the movement of the piston caused on one side of the second membrane can be transmitted to another side of the second membrane. This makes it possible to arrange several drive devices axially nested/behind each other.

According to the preferred embodiment, the second membrane and the piston may be unconnected/separate from each other. That is, the second membrane is not firmly connected to the piston, but only rests/abuts/lies against it. Otherwise, the second membrane would be weakened at the connection point to the piston, so that material failure/tearing of the second membrane could occur more easily. Further, the second membrane, when the second membrane is deflected, may contact the piston to push/displace the piston to a second side in the longitudinal direction of the piston. That is, due to the unconnectedness between the piston and the second membrane, there is only a pushing movement of the piston actuated by the second membrane and no pulling movement actuated by the second membrane. Thus, the second membrane can (only) move the piston in one direction/to the second side when pressure is applied/by pressurizing the second pressure chamber, because when the pressure is released/by depressurizing the second chamber, the second membrane retracts/moves backwards without causing the piston to move.

According to an alternative embodiment, the drive device may comprise a return spring, the piston being translationally movable/displaceable against a return force of the return spring by deflection of the first membrane. That is, in particular instead of providing a second membrane, the return/the displacement of the piston to the second side (against the displacement by the first membrane) can also be caused by the return force of the return spring. This means that only one membrane (only the first membrane) is required.

According to a preferred embodiment, the drive device may comprise a position sensor for detection of a translational position of the piston. In this way—in addition to feedback on the applied pneumatic pressure—precise control of the piston can be achieved. Preferably, the position sensor may be an optical sensor, for example, a laser.

The position sensor may be designed as a distance meter, in particular as a laser. Such distance meters are inexpensive, compact and easy to control. In particular, the position sensor may be aligned in a radial direction for detection of a radial distance to the piston. As there is more space in the drive device for radial mounting (as the first and second membranes are axially arranged), suitable position detection can be ensured. Alternatively, the position sensor may be aligned in an axial direction for detection of an axial distance to the piston. Thus, the translational position of the piston can be directly detected.

According to the preferred embodiment, the piston may have, at least in an axial portion and at least in a circumferential portion of the piston, a diameter which changes in the longitudinal direction of the piston, preferably continuously, in particular strictly monotonously increasing or decreasing. The diameter is formed in such a way that the translational position of the piston is enabled to be determined by the position sensor on the basis of measured distance to the changing diameter. That is, the changing diameter is configured to be detected by the position sensor. Preferably, the piston may have a sloped/inclined portion being inclined to the axial direction and to the radial direction. In particular, the axial portion may be conical/tapered. Thus, due to the conical design, i.e. the design of the inclined section over the entire circumference, the piston can be mounted independently of its rotational position. This prevents the inclined section from being located outside the area of the position sensor. The changing diameter of the piston makes it possible to (unambiguously) determine the translational position of the piston on the basis of a radially measured distance to the diameter of the piston. Further, the axial portion may be defined by a range within which the piston is moved/displaced. Moreover, the axial portion and the circumferential portion are defined by a range where the position sensor is arranged. Thus, the position can be detected in every possible position of the piston.

According to the preferred embodiment, the piston may have a grey scale of grey values which change, preferably continuously, in particular strictly monotonously increasing or decreasing, in the longitudinal direction of the piston. For example, the grey values may vary from white to black. The grey values are formed in such a way that the translational position of the piston is enabled to be determined by the position sensor on the basis of measured reflection of the changing grey values. That is, the changing grey values are configured to be detected by the position sensor.

According to the preferred embodiment, the position sensor may be a Hall sensor or a magnetostrictive sensor. Further, the piston may have a magnet. The magnet may be positioned in such a way that the translational position of the piston is enabled to be determined by the position sensor on the basis of measured magnetic field change. That is, the changing magnet field is configured to be detected by the position sensor.

According to a preferred embodiment, the drive device may comprise a pressure control to control the deflection of the first membrane and the second membrane (and thus the displacement of the piston). The pressure control may be an open-loop control circuit or a closed-loop control circuit. Further, the pressure control may be configured to control the deflection of the first membrane and the second membrane in dependence of the translational position of the piston detected by the position sensor. The pressure control may be connected to the first pressure chamber and the second pressure chamber by radial supply into the housing.

According to the preferred embodiment, the pressure control may comprise valves connected to the first pressure chamber and the second pressure chamber to control the deflection of the first membrane and the second membrane by regulating a differential pressure between the first pressure chamber and the second pressure chamber. For example, a closed compressed air system may be formed so that it is not necessary to permanently supply and discharge new compressed air. In addition, it can be achieved that the first and second membranes are in contact with the piston at all times. Alternatively, the pressure in the first pressure chamber and the second pressure be set independently of each other. Thus, it is possible to adjust the pressure of the undeflected first or second membrane as required.

According to the preferred embodiment, the valves may be proportional control valves. That is, the pressure in the first pressure chamber and the second pressure chamber can be regulated continuously/proportionally so that the deflection of the first membrane and the second membrane can be stopped at any desired point. Thus, it is not only possible to switch the valves on or off, but to supply more or less pressure into the first pressure chamber and the second pressure chamber.

According to a second aspect of the disclosure, there is a pneumatic drive device for rotational movement of an actuator shaft of a medical instrument, in particular a minimally invasive instrument. The drive device comprises a housing. The housing may be preferably substantially cylindrical/tubular.

The drive device comprises an output element. The output element is mounted in the housing so as to be rotatable about a longitudinal axis of the output element. In particular, the output element may be rotatable within the housing. The longitudinal axis of the output element may preferably be parallel to an axial direction of the drive device/of the housing. A movement of the output element is configured to be coupled to a movement of the actuator shaft, preferably as a direct drive (without an additional gearbox for converting or translating the movement of the output element). Thus, the movement the output element causes the movement of the actuator shaft, in particular almost loss-free and with a direct/proportional feedback between applied pneumatic pressure and the movement generated thereby.

The drive device comprises a membrane. The membrane may be preferably elastically stretchable or expandable like an accordion. The membrane is fixedly mounted in the housing. For example, the membrane may be clamped/spanned onto a plate fixed to the housing. The membrane defines at least three pressure chambers. That is, the at least three pressure chambers are surrounded by the membrane in a gas-tight manner. The membrane may define more than three pressure chambers, for example, four pressure chambers, five pressure chambers or six pressure chambers. The at least three pressure chambers are arranged so as to be, preferably equally, distributed in a circumferential direction. That is, each of the pressure chambers may extend over an angular/arc section of 120°. The membrane enabled to be (reversibly) axially deflected in a circumferential region of the corresponding pressure chamber by pressurizing the respective pressure chamber. That is, by pressurization a first pressure chamber of the at least three pressure chambers increases so that the membrane, for example due to its material-related stretching and/or its geometry-related expandability, is caused to axially deflect in the circumferential region of the first pressure chamber. Further, that is, by depressurization the first pressure chamber decreases so that the membrane returns to an original state of the membrane and is caused to axially shrink in the circumferential region of the first pressure chamber. Accordingly, by pressurization a second pressure chamber of the at least three pressure chambers increases so that the membrane is caused to axially deflect in the circumferential region of the second pressure chamber, and by depressurization the second pressure chamber decreases so that the membrane returns to the original state of the membrane and is caused to axially shrink in the circumferential region of the second pressure chamber. Accordingly, by pressurization a third pressure chamber of the at least three pressure chambers increases so that the membrane is caused to axially deflect in the circumferential region of the third pressure chamber, and by depressurization the third pressure chamber decreases so that the membrane returns to the original state of the membrane and is caused to axially shrink in the circumferential region of the third pressure chamber. Preferably, the deflection of the membrane can be regulated continuously/steplessly.

According to the second aspect, the membrane and the output element are coupled to each other in such a way that a circumferentially section-wise oscillating axial movement of the membrane, caused by circumferentially successive pressurization and depressurization of the respective pressure chambers, is converted into a rotational movement/rotation of the output element about the longitudinal axis of the output element. In particular, the axial movement of the membrane is, preferably transmitted via axial pistons and, converted into the rotational movement of the output element in the manner of an axial piston motor.

Since the pressurization of the pressure chambers can be controlled proportionally, and therefore sensitively, and since the deflection of the membrane and thus the axial movement of the axial piston is almost proportional to the pressure, the stroke of the axial pistons can be controlled or regulated with particular precision, in particular increment-free, i.e. not in steps specified by the mechanical design. Thus, it is not only possible to switch the stroke of the axial pistons between on or off/fully extended and fully retracted, but to supply more or less pressure into the pressure chambers to move the axial pistons to any position between fully extended and fully retracted.

Due to the design in the manner of an axial piston motor, the rotation of the output element is not limited, in contrast to a drive device in which an axial movement is directly converted into a rotation and thus a maximum axial stroke determines a maximum angular rotation. Thus, the output element can be rotated infinitely in both directions of rotation.

According to a preferred embodiment, the drive device may comprise a wobble/swash plate. The wobble plate may be arranged axially between the membrane and the output element. A wobbling movement of the wobble plate may convert the circumferentially section-wise oscillating axial movement of the membrane into the rotational movement/rotation of the output element. Preferably, the drive device may comprise axial pistons, and the circumferentially section-wise oscillating axial movement of the membrane may be transmitted to the wobble plate via the axial pistons. That is, the axial movement of the membrane may be transmitted to the wobble plate via the axial pistons/pins (of the axial piston motor), each of the axial pistons being axially pushed by a respective pressure chamber, being axially coupled to/snapped into the wobble plate and being ball bearing mounted to the wobble plate. In particular, the wobble plate performs a tumbling/wobbling motion, that is, moves on a spherical surface actuated by the axial piston movement of the at least three pressure chambers. In other words, when converting the circumferentially section-wise oscillating axial movement of the membrane into the rotational movement/rotation of the output element about the longitudinal axis of the output element, the wobble plate forms a constant wobble angle to the longitudinal axis of the output element, but rotating wobble angle about the longitudinal axis of the output element.

According to the preferred embodiment, the wobble plate may be mounted in the housing so as be rotatably fixed to the housing and so as to be rotatable relative to the output element about a longitudinal axis of the wobble plate (and/or the longitudinal axis of the output element). Further, the longitudinal axis of the wobble plate may preferably be inclined to the longitudinal axis of the output element by 15° to 25°. This ensures sufficient power transmission. For example, the wobble plate may be rotatably mounted to the output element via a roller bearing, such as an axial ball bearing or alternative such as a radial ball bearing. Alternatively, the wobble plate may be rotatably mounted to the output element via a plain bearing. For example, the wobble plate may be rotatably fixed to the housing by positive rotational engagement with the housing, such as a projection of the wobble plate engaging with a groove of the housing. Preferably, a circumferential extension of the groove may correspond the projection to avoid a relative rotation between the wobble plate and the housing. Further, an axial extension of the groove may at least correspond to a maximum stroke/axial movement of the membrane to enable the tumbling/wobbling movement of the wobble plate relative to the housing.

According to a preferred embodiment, the membrane may have a cross-section being substantially shaped as a (circular) ring, so that a through hole axially extends through the membrane. That is, the membrane is not formed in a central area, but surrounds this central area, preferably as a ring or several ring sections, or alternatively in another form. The ring or the ring sections may preferably be coaxial, or substantially coaxial, to the longitudinal axis of the output element. That is, that the central area (in which the membrane is not formed) may be preferably centrally arranged with respect to the drive device/centrally around the longitudinal axis of the output element. Thus, components of the drive device can be passed through the membrane, in particular to connect components arranged axially on both sides of the membrane.

According to the preferred embodiment, the drive device may comprise an output element rod. The output element rod may be (fixedly) coupled to the output element, at least in the rotational direction, and axially extend through the through hole through the membrane. Thus, by the output element rod axially passing through the membrane, the movement of the output element caused on one side of the first membrane can be transmitted to another side of the first membrane. This makes it possible to arrange several drive devices axially nested/behind each other.

According to a preferred embodiment, the drive device may comprise a position sensor for detection of a rotational position of the output element. In this way—in addition to feedback on the applied pneumatic pressure—precise control of the output element can be achieved. Preferably, the position sensor may be an optical sensor, for example, a laser.

The position sensor may be designed as a distance meter, in particular as a laser. Such distance meters are inexpensive, compact and easy to control. In particular, the position sensor may be aligned in a radial direction for detection of a radial distance to the output element. As there is more space in the drive device for radial mounting (as the membrane is axially arranged), suitable position detection can be ensured.

According to the preferred embodiment, the output element may have, at least in an axial portion and at least in a circumferential portion of the output element, preferably over the entire circumference, a diameter which changes in the circumferential direction, preferably continuously, in particular strictly monotonously increasing or decreasing. In particular, the axial portion may be cam-shaped. The diameter may be formed in such a way that the rotational position of the output element is enabled to be determined by the position sensor on the basis of measured distance to the changing diameter. That is, the changing diameter is configured to be detected by the position sensor. The circumferentially changing diameter of the output element makes it possible to determine the rotational position of the output element on the basis of a radially measured distance to the diameter of the output element. Further, the circumferential portion may be defined by a range within which the output element is rotated. Further, the axial portion and the circumferential portion may be defined by a range where the position sensor is arranged. Thus, the position can be detected in every possible position of the output element.

According to the preferred embodiment, the output element may have at least two cams, the cams each having at least in an circumferential portion of the respective cam, preferably over the entire circumference, a diameter which changes in the circumferential direction, preferably continuously, in particular strictly monotonously increasing or decreasing. The diameters of the cams may be formed in such a way that the rotational position of the output element is enabled to be (unambiguously) determined by the position sensor on the basis of measured distances to the diameters of the cams. That is, the changing diameters are configured to be detected by the position sensor. Since the output element can rotate about more than 360°, it is only possible to unambiguously determine the rotational position with only one circumferentially changing diameter portion, if the output element increases in diameter steadily over the circumference, for example, from 0 to 360°. However, this would only be possible if there is a jump in diameter at the point of 0° or 360°. By providing the two cams (each having a substantially egg-shaped cross-section), although there are two different rotational positions on each cam where the radial distance is the same, in combination with the radial distance of the respective other cam, this can be detected as a unique rotational position of the output element.

According to the preferred embodiment, the output element may have a grey scale of grey values which change, preferably continuously, in particular strictly monotonously increasing or decreasing, in the circumferential direction (of the output element). For example, the grey values may vary from white to black. The grey values are formed in such a way that the rotational position of the piston is enabled to be determined by the position sensor on the basis of measured reflection of the changing grey values. That is, the changing grey values are configured to be detected by the position sensor. Preferably, the output element may have at least two of the grey scale of grey values, and the grey scales being displaced to each other. By providing the two displaced grey scales, a unique rotational position of the output element can be detected.

According to the preferred embodiment, the position sensor may be a Hall sensor or a magnetostrictive sensor. Further, the output element may have a magnet. Preferably, the magnet may be concentrically arranged to the longitudinal axis of the output element. The magnet may be positioned in such a way that the rotational position of the output element is enabled to be determined by the position sensor on the basis of measured magnetic field change. That is, the changing magnet field is configured to be detected by the position sensor.

According to a preferred embodiment, the drive device may comprise a pressure control to control the pressurizing and depressurizing of the at least three pressure chambers and thus, the deflection of the membrane (and thus the rotation of the output element). The pressure control may be an open-loop control circuit or a closed-loop control circuit. Further, the pressure control may be configured to control the deflection of the membrane in dependence of the rotational position of the output element detected by the position sensor. The pressure control may be connected to the at least three pressure chambers by radial supply into the housing.

According to a third aspect of the disclosure, there is a drive system comprising at least one first drive device and at least one second drive device. The first drive device may be a drive device according to the first aspect or the second aspect of the disclosure. The second drive device may be a drive device according to the first aspect or the second aspect of the disclosure. That is, the drive system comprises two drive devices both of which may be designed as drive device for rotational movement, both of which may be designed as drive device for translational movement or one of which may be designed as drive device for translational movement and one of which may be designed as drive device for rotational movement. In other words, in the drive system according to the disclosure, the drive devices may be combined with each other in any way. The drive system may also have more than two drive devices.

According to the third aspect, the drive devices have a common longitudinal axis. The common longitudinal axis may preferably correspond to the longitudinal axis of the piston and the output element. Further, the piston rod and the output element rod may preferably be arranged radially nested. Further, the drive devices may preferably arranged axially one behind the other. In other words, the first membrane, the second membrane and the membrane being formed as a ring enables to couple several drive device axially one behind the other, with the piston rod and the output element rod being radially nested and axially extending through the first membrane, the second membrane and the membrane. Thus, an instrument being arranged at a first side of one of the drive devices may also be actuated by one of the drive devices being arranged at a second side of the one of the drive devices. Hence, the instrument may be actuated in more than one way by providing several drive devices.

BRIEF DESCRIPTION OF THE DRAWING FIGURES

Figure 6:
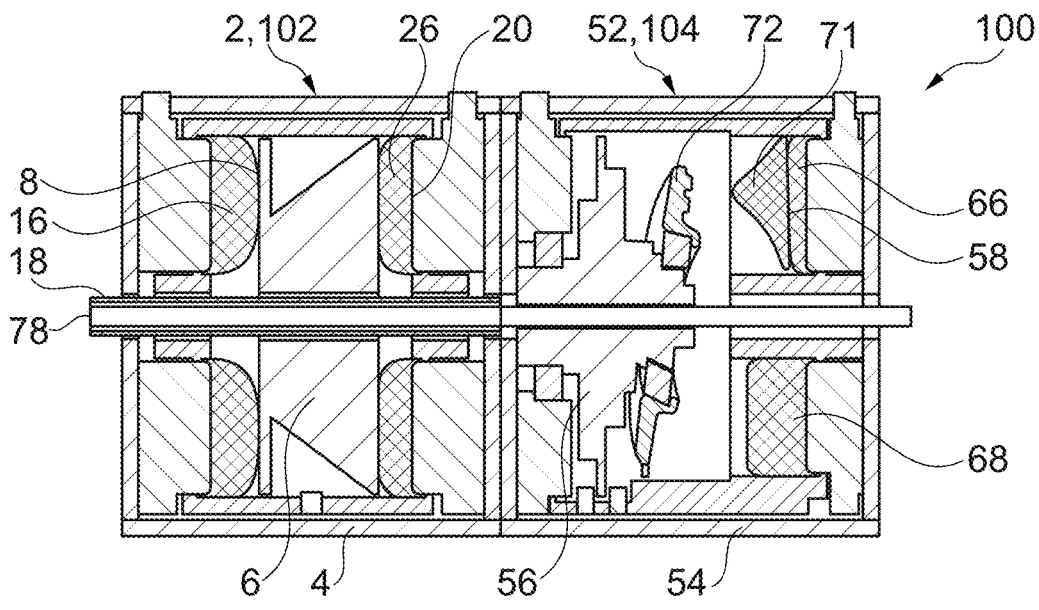

FIGS. 1 and 2 show schematical views of a drive device according to a first aspect of the present disclosure in two different positions, FIG. 3 shows a schematical view of a drive device according to a second aspect of the present disclosure, FIGS. 4 and 5 show schematical views for explanation of an operating principle of the drive device according to the second aspect, FIG. 6 shows a schematical view of a drive system comprising a drive device according to the first aspect of the present disclosure and a drive device according to the second aspect of the present disclosure.

DETAILED DESCRIPTION OF THE INVENTION

In the following preferred embodiments of the present disclosure are described on the basis of the accompanying figures.

FIGS. 1 and 2 show schematical views of a drive device 2 according to a first aspect of the present disclosure. The drive device 2 is a pneumatic drive device for translational movement of an actuator shaft of a medical instrument, in particular a minimally invasive instrument.

The medical instrument may comprise the actuator shaft and an effector coupled to the actuator shaft. The translational movement of the actuator shaft may be converted into an inclination adjustment of the effector or into an opening/closing movement of the effector.

The drive device 2 comprises a housing 4. The housing 4 may be preferably substantially cylindrical or may comprise a tubular portion. The housing 4/the tubular portion of the housing 4 may have a longitudinal axis corresponding to a longitudinal axis of the drive device 2. In the following, an axial direction is referred to as a direction being parallel to the longitudinal axis of the drive device 2.

The drive device 2 comprises a piston 6. The piston 6 is mounted in the housing 4 so as to be slidable/displaceable along a longitudinal axis of the piston 6/along a longitudinal direction of the piston 6. The longitudinal axis of the piston 6 may correspond to the longitudinal axis of the drive device 2. That is, the piston 6 is axially movable within the housing 4. A movement of the piston 6 is configured to be (directly/fixedly) coupled to a movement of the actuator shaft. That is, the movement the piston 6 causes the movement of the actuator shaft.

The drive device 2 comprises a first membrane 8. In the embodiment, the first membrane 8 is clamped/spanned onto a plate 10 fixed to the housing 4. On a radially outer side, the first membrane 8 is clamped between the plate 10 and a first sleeve 12. The plate 10 and the first sleeve 12 may be connected to each other via a snap connection. On a radially inner side, the first membrane 8 is clamped between the plate 10 and a second sleeve 14. The plate 10 and the second sleeve 14 may be connected to each other via a snap connection. That is, the first membrane 8 is fixedly mounted in the housing 4.

The first membrane 8 defines a first pressure chamber 16. That is, the first pressure chamber 16 is surrounded by the first membrane 8 (and the plate 10) in a gas-tight manner. The first membrane 8 may be preferably elastically stretchable or expandable like an accordion. The first membrane 8 is enabled to be (reversibly) axially deflected by pressurizing the first pressure chamber 16. If there is no air in the first pressure chamber 16, the first membrane 8 lies flat against the plate 10. By pressurization, the first pressure chamber 16 increases so that the first membrane 8 is caused to axially deflect (see FIG. 1). By depressurization, the first pressure chamber 16 decreases so that the first membrane 8 returns to an original state of the first membrane 8 and is caused to axially shrink (see FIG. 2). By increasing the pressure in the first pressure chamber 16, the first membrane 8 axially deflects/moves towards the piston 6, that is, to a first side in the axial direction (which is the right side in the figures). By decreasing the pressure in the first pressure chamber 16, the first membrane 8 axially shrinks/moves away from the piston 6, that is, to a second side in the axial direction (which is the left side in the figures).

The first membrane 8 and the piston 6 are coupled to each other in such a way that an axial movement of the first membrane 8 (caused by pressurizing the first pressure chamber 16) is converted into a translational movement/displacement of the piston 6 along the longitudinal direction of the piston 6, in particular by contacting/pushing/abutting the piston 6/exerting a compressing force on the piston 6 to the first side in the axial direction.

Preferably, the first membrane 8 and the piston 6 may be unconnected. That is, the first membrane 8 is not firmly connected to the piston 6, but only rests/abuts/lies against it. When inflating the first membrane 8, the first membrane 8 pushes the piston 6 to the first side in the axial direction. When deflating the first membrane 8, the first membrane 8 does not pull the piston 6 to the second side in the axial direction. That is, the first membrane 8 retracts/moves backwards without causing the piston 6 to move.

Preferably, the drive device 2 may comprise a piston rod 18. The piston rod 18 may be (fixedly) coupled to the piston 6, at least in the axial direction. That is, the movement of the piston 6 along the longitudinal axis of the piston 6 causes an axial movement of the piston rod 18. The piston rod 18 may be coaxial to the longitudinal axis of the piston 6 and/or the longitudinal axis of the drive device 2. The piston rod 18 may be formed as a hollow shaft or as a solid shaft. The piston rod 18 may preferably be (directly/fixedly) coupled to the movement of the actuator shaft. In particular, the piston rod 18 may integrally form the actuator shaft.

Preferably, the first membrane 8 may have a cross-section being substantially shaped as a (circular) ring, so that a through hole axially extends through the first membrane 8. The ring-shaped first membrane 8 may preferably be coaxial to the longitudinal axis of the piston 6 and/or the longitudinal axis of the drive device 2. Preferably, the piston rod 18 may axially extend through the through hole through the first membrane 8. That is, the piston rod 18 may be supported radially inside the first membrane 8 and/or the second sleeve 14.

The drive device 2 comprises a second membrane 20. The second membrane 20 may have substantially the same configuration as the first membrane 8. The second membrane 20 may preferably be arranged on a side of the piston 6 opposite to the first membrane 8. In the embodiment, the second membrane 20 is clamped/spanned onto a plate 22 fixed to the housing 4. On a radially outer side, the first membrane 8 is clamped between the plate 22 and the first sleeve 12. The plate 22 and the first sleeve 12 may be connected to each other via a snap connection. On a radially inner side, the first membrane 8 is clamped between the plate 20 and a third sleeve 24. The plate 20 and the third sleeve 24 may be connected to each other via a snap connection. That is, the second membrane 20 is fixedly mounted in the housing 4.

The second membrane 20 defines a second pressure chamber 26. That is, the second pressure chamber 26 is surrounded by the second membrane 20 (and the plate 20) in a gas-tight manner. The second membrane 20 may be preferably elastically stretchable or expandable like an accordion. The second membrane 20 is enabled to be (reversibly) axially deflected by pressurizing the second pressure chamber 26. If there is no air in the second pressure chamber 26, the second membrane 20 lies flat against the plate 20. By pressurization, the second pressure chamber 26 increases so that the second membrane 20 is caused to axially deflect (see FIG. 2). By depressurization, the second pressure chamber 26 decreases so that the second membrane 20 returns to an original state of the second membrane 20 and is caused to axially shrink (see FIG. 1). By increasing the pressure in the second pressure chamber 26, the second membrane 20 axially deflects/moves towards the piston 6, that is, to the second side in the axial direction (which is the left side in the figures). By decreasing the pressure in the second pressure chamber 26, the second membrane 20 axially shrinks/moves away from the piston 6, that is, to the first side in the axial direction (which is the right side in the figures).

The second membrane 20 and the piston 6 are coupled to each other in such a way that an axial movement of the second membrane 20 (caused by pressurizing the second pressure chamber 26) is converted into a translational movement/displacement of the piston 6 along the longitudinal direction of the piston 6, in particular by contacting/pushing/abutting the piston 6/exerting a compressing force on the piston 6 to the second side in the axial direction.

Preferably, the second membrane 20 and the piston 6 may be unconnected. That is, the second membrane 20 is not firmly connected to the piston 6, but only rests/abuts/lies against it. When inflating the second membrane 20, the second membrane 20 pushes the piston 6 to the second side in the axial direction. When deflating the second membrane 20, the second membrane 20 does not pull the piston 6 to the first side in the axial direction. That is, the second membrane 20 retracts/moves backwards without causing the piston 6 to move.

Preferably, the second membrane 20 may have a cross-section being substantially shaped as a (circular) ring, so that a through hole axially extends through the second membrane 20. The ring-shaped second membrane 20 may preferably be coaxial to the longitudinal axis of the piston 6 and/or the longitudinal axis of the drive device 2. Preferably, the piston rod 18 may axially extend through the through hole through the second membrane 20. That is, the piston rod 18 may be supported radially inside the second membrane 20 and/or the third sleeve 24.

Preferably, the drive device 2 may comprise a position sensor 28 for detection of a translational position of the piston 6. The position sensor 28 may be fixedly mounted to the housing 4 (in the embodiment, to the first sleeve 12). The position sensor 28 may be designed as an optical sensor, for example as a laser. The position sensor 28 may be a distance meter. Alternatively, the positon sensor 28 may be a Hall sensor or a magnetostrictive sensor. Further, the position sensor 28 may be aligned in a radial direction for detection of a radial distance to the piston 6. Alternatively, although not illustrated, the position sensor may be aligned in an axial direction for detection of an axial distance to the piston and thus, for direct detection of the translational position of the piston.

Preferably, the piston 6 may comprise a detection portion 30 for being detected by the position sensor 28. The detection portion 30 has a diameter changing along the longitudinal direction of the piston 6. In particular, the detection portion 30 is conical such that the translational positon of the piston 6 can be (unambiguously) determined from a radial distance to the diameter. The detection portion 30 may extend in such a way that the position sensor 28 can detect the detection portion 30 over an entire stroke of the piston 6.

Alternatively, the detection portion 30 may be cylindrical. The detection portion 30 may have a grey scale of grey values which change in the longitudinal direction. The grey values may be formed in such a way that the translational position of the piston 6 is enabled to be determined by the position sensor 28 on the basis of measured reflection of the changing grey values.

FIG. 3 shows a schematical view of a drive device 52 according to a second aspect of the present disclosure. The drive device 52 is a pneumatic drive device for rotational movement of an actuator shaft of a medical instrument, in particular a minimally invasive instrument.

The medical instrument may comprise the actuator shaft and an effector coupled to the actuator shaft. The rotational movement of the actuator shaft may be a desired actuation of the medical instrument or may be converted into rotation of the effector.

The drive device 52 comprises a housing 54. The housing 54 may be preferably substantially cylindrical or may comprise a tubular portion. The housing 54/the tubular portion of the housing 54 may have a longitudinal axis corresponding to a longitudinal axis of the drive device 52. In the following, an axial direction is referred to as a direction being parallel to the longitudinal axis of the drive device 52.

The drive device 52 comprises an output element 56. The output element 56 is mounted in the housing so as to be rotatable about a longitudinal axis of the output element 56. The longitudinal axis of the output element 56 may correspond to the longitudinal axis of the drive device 52. That is, the output element 56 is rotatable within the housing 54, for example via a roller bearing. A movement of the output element 56 is configured to be (directly/fixedly) coupled to a movement of the actuator shaft. That is, the movement the output element 56 causes the movement of the actuator shaft.

The drive device 52 comprises a membrane 58. In the embodiment, the membrane 58 is clamped/spanned onto a plate 60 fixed to the housing 54. On a radially outer side, the membrane 58 is clamped between the plate 60 and a first sleeve 62. The plate 60 and the first sleeve 62 may be connected to each other via a snap connection. On a radially inner side, the membrane 58 is clamped between the plate 60 and a second sleeve 64. The plate 60 and the second sleeve 64 may be connected to each other via a snap connection. That is, the membrane 58 is fixedly mounted in the housing 54.

The membrane 58 defines at least three pressure chambers 66, 68, 70. That is, least three pressure chambers 66, 68, 70 are surrounded by the first membrane 58 (and the plate 60) in a gas-tight manner. The membrane 58 may define more than three pressure chambers, for example, four pressure chambers, five pressure chambers or six pressure chambers. The membrane 58 may be preferably elastically stretchable or expandable like an accordion. The at least three pressure chambers 66, 68, 70 are arranged so as to be, preferably equally, distributed in a circumferential direction. That is, each of the pressure chambers 66, 68, 70 may extend over an angular/arc section of about 120° (see FIGS. 4 and 5).

An operating principle of the membrane 58 can best be seen in FIGS. 4 and 5. The membrane 58 is enabled to be (reversibly) axially deflected in a circumferential region of the corresponding pressure chamber 66, 68, 70 by pressurizing the respective pressure chamber 66, 68, 70. By pressurization, a first pressure chamber 66 of the at least three pressure chambers 66, 68, 70 increases so that the membrane 58 is caused to axially deflect in the circumferential region of the first pressure chamber 66. By depressurization, the first pressure chamber 66 decreases so that the membrane 58 returns to an original state of the membrane 58 and is caused to axially shrink in the circumferential region of the first pressure chamber 66. By pressurization, a second pressure chamber 68 of the at least three pressure chambers 66, 68, 70 increases so that the membrane 58 is caused to axially deflect in the circumferential region of the second pressure chamber 68. By depressurization, the second pressure chamber 68 decreases so that the membrane 58 returns to the original state of the membrane 58 and is caused to axially shrink in the circumferential region of the second pressure chamber 68. By pressurization, a third pressure chamber 70 of the at least three pressure chambers 66, 68, 70 increases so that the membrane 58 is caused to axially deflect in the circumferential region of the third pressure chamber 70. By depressurization, the third pressure chamber 70 decreases so that the membrane 58 returns to the original state of the membrane 58 and is caused to axially shrink in the circumferential region of the third pressure chamber 70. That is, circumferentially successive pressurization and depressurization of the respective pressure chambers 66, 68, 70 causes a circumferentially section-wise oscillating axial movement of the membrane 58.

The membrane 58 and the output element 56 are coupled to each other in such a way that the circumferentially section-wise oscillating axial movement of the membrane 58 (caused by circumferentially successive pressurization and depressurization of the respective pressure chambers 66, 68, 70) is transmitted via axial pistons 71 and converted into a rotational movement/rotation of the output element 56 about the longitudinal axis of the output element 56. In particular, the axial movement of the membrane 58 is converted into the rotational movement of the output element 56 in the manner of an axial piston motor.

Preferably, the drive device 52 may comprise a wobble/swash plate 72. The wobble plate 72 may be arranged axially between the membrane 58 and the output element 56. A wobbling movement of the wobble plate 72 may convert the circumferentially section-wise oscillating axial movement of the membrane 58 (via the axial pistons 71) into the rotational movement/rotation of the output element 56. The axial pistons 71 may be axially snapped into the wobble plate 72 and ball bearing mounted to the wobble plate 72. In particular, the wobble plate 72 performs a tumbling/wobbling motion, that is, moves on a spherical surface actuated by the axial piston movement of the at least three pressure chambers 66, 68, 70.

Preferably, the wobble plate 72 may be mounted in the housing 54 so as be rotatably fixed to the housing 54 and so as to be rotatable relative to the output element 56 about a longitudinal axis of the wobble plate 72 and/or the longitudinal axis of the output element 56. Further, the longitudinal axis of the wobble plate 72 may preferably be inclined to the longitudinal axis of the output element 56 by 15° to 25°, preferably by about 20°.

For example, the wobble plate 72 may be rotatably mounted to the output element 56 via a roller bearing, such as an axial ball bearing or alternative such as a radial ball bearing. Alternatively, the wobble plate may be rotatably mounted to the output element via a plain bearing.

For example, the wobble plate 72 may be rotatably fixed to the housing 54 by positive rotational engagement with the housing 54, such as a projection 74 of the wobble plate 72 engaging with a groove 76 of the housing 54 or the first sleeve 62 fixed to the housing 54. Preferably, a circumferential extension of the groove 76 may correspond the projection 74. Further, an axial extension of the groove 76 may at least correspond to a maximum stroke/axial movement of the membrane 58.

Preferably, the membrane 58 and the wobble plate 72 may be unconnected. That is, the membrane 58 is not firmly connected to the wobble plate 72, but only rests/abuts/lies against it. When inflating the membrane 58, the membrane 58 pushes (via the axial pistons 71) the wobble plate 72 to a second side in the axial direction in the circumferential of the respective pressurized pressure chamber 66, 68, 70 causing the wobble plate 72 to incline/tumble/wobble, which causes the output element 56 to rotate about by a corresponding angular section. When deflating the membrane 58, the membrane 58 does not pull the wobble plate 72 to a first side in the axial direction. That is, the membrane 58 retracts/moves backwards without causing the wobble plate 72 to move.

Preferably, the drive device 52 may comprise an output element rod 78. The output element rod 78 may be (fixedly) coupled to the output element 56, at least in the rotational direction. That is, the rotation of the output element 56 about the longitudinal axis of the output element 56 causes a rotation of the output element rod 78. The output element rod 78 may be coaxial to the longitudinal axis of the output element 56 and/or the longitudinal axis of the drive device 52. The output element rod 78 may be formed as a hollow shaft or as a solid shaft. The output element rod 78 may preferably be (directly/fixedly) coupled to the movement of the actuator shaft. In particular, the output element rod 78 may integrally form the actuator shaft.

Preferably, the membrane 58 may have a cross-section being substantially shaped as a (circular) ring, so that a through hole axially extends through the membrane 58. The ring-shaped membrane 58 may preferably be coaxial to the longitudinal axis of the output element 56 and/or the longitudinal axis of the drive device 52. Preferably, the output element rod 78 may axially extend through the through hole through the membrane 58. That is, the output element rod 78 may be supported radially inside the membrane 58 and/or the second sleeve 64.

Preferably, the drive device 52 may comprise a position sensor 80 for detection of a rotational position of the output element 56. The position sensor 80 may be fixedly mounted to the housing 4 (in the embodiment, to the first sleeve 62). The position sensor 80 may be designed as an optical sensor, for example as a laser. The position sensor 80 may be a distance meter. Alternatively, the positon sensor 80 may be a Hall sensor or a magnetostrictive sensor. Further, the position sensor 80 may be aligned in a radial direction for detection of a radial distance to the output element 56. In the embodiment, the position sensor 80 comprises a first position sensor 82 and a second position sensor 84.

Preferably, the output element 56 may comprise a detection portion 86 for being detected by the position sensor 80. The detection portion 86 has a diameter changing in the circumferential direction.

In particular, the detection portion 86 is cam-shaped such that the rotational positon of the output element 56 can be determined from a radial distance to the diameter. The detection portion 86 may extend in such a way that the position sensor 82 can detect the detection portion 86 over an entire stroke of the membrane 58, that over an entire angle adjustment range of the output element 56. In the embodiment, the detection portion 86 comprises a first cam 88 and a second cam 90. The first cam 88 is detected by the first position sensor 82 and the second cam 90 is detected by the second position sensor 84. The diameters of the cams 88, 90 may be formed in such a way that the rotational position of the output element 56 is enabled to be unambiguously determined by the position sensors 82, 84 on the basis of measured distances to the diameters of the cams 88, 90.

Alternatively, the detection portion 86 may be cylindrical. The detection portion 86 may have a grey scale of grey values which change in the circumferential direction. The grey values may be formed in such a way that the rotational position of the output element 56 is enabled to be determined by the position sensor 80 on the basis of measured reflection of the changing grey values. In particular, the detection portion 86 may have two grey scales of grey values, the grey scales being displaced to each other. A first grey scale of the two grey scales may be formed in such a way that the rotational position of the output element 56 is enabled to be determined by the first position sensor 82 on the basis of measured reflection of the changing grey values. A second grey scale of the two grey scales may be formed in such a way that the rotational position of the output element 56 is enabled to be determined by the first position sensor 84 on the basis of measured reflection of the changing grey values.

Alternatively, the detection portion 86 may have a magnet. Preferably, the magnet may be concentrically arranged to the longitudinal axis of the output element 56. The magnet may be positioned in such a way that the rotational position of the output element 56 is enabled to be determined by the position sensor 80 on the basis of measured magnetic field change.

FIG. 6 shows a schematic view of a drive system 100 according to a third aspect of the disclosure. The drive system 100 comprises at least one first drive device 102 and at least one second drive device 104. The first drive device 102 may be formed as the drive device 2 for translational movement or the drive device 52 for rotational movement. In the shown embodiment, the first drive device 102 is formed as the drive device 2. The second drive device 104 may be formed as the drive device 2 or the drive device 52. In the shown embodiment, the second drive device 102 is formed as the drive device 52. The drive system 100 may also have more than two drive devices.

The drive devices 102, 104 are arranged to as to have a common longitudinal axis. The common longitudinal axis may preferably correspond to the longitudinal axis of the drive devices 2, 52 and/or the longitudinal axis of the piston 6 and the output element 56.

Preferably, the piston rod 18 and the output element rod 78 may be arranged radially nested. In the embodiment, the piston rod 18 is formed as a hollow shaft radially supporting the output element rod 78. Alternatively, the output element rod 78 may formed as a hollow shaft radially supporting the piston rod 18. Further, both, the piston rod 18 and the output element rod 78, may be formed as hollow shafts.

Preferably, the drive devices 102, 104 may be arranged axially one behind the other. That is, the first membrane 8, the second membrane 20 and the membrane 50 being formed as a ring enables to couple several drive devices axially one behind the other, with one of the piston rod 18 and the output element rod 78 or both/all of the piston rod 18 and the output element 78 axially extending through the first membrane 8, the second membrane 20 and/or the membrane 58.

The invention claimed is:

1. A pneumatic drive device for translational movement of an actuator shaft of a medical instrument, said pneumatic drive device comprising:

a housing being substantially cylindrical;

a piston mounted in the housing so as to be slidable along a longitudinal axis of the piston, a movement of the piston being configured to be coupled to a movement of the actuator shaft;

a first membrane being elastically stretchable or expandable, the first membrane fixedly mounted in the housing, the first membrane defining a first pressure chamber, the first membrane being configured to be axially deflected by pressurizing the first pressure chamber, and the first membrane having a substantially ring-shaped cross-section such that a through-hole axially extends through the first membrane; and a piston rod coupled to the piston and axially extending through the through-hole of the first membrane, the first membrane and the piston coupled to each other in such a way that an axial movement of the first membrane, caused by pressurizing the first pressure chamber, is converted into a translational movement of the piston along the longitudinal axis of the piston, wherein the first membrane abuts the piston and expansion of the first membrane causes the piston to move along the longitudinal axis of the piston by pushing the piston; and a first plate fixed to the housing and a first sleeve fixed to the first plate, the first membrane being disposed between the first plate and the first sleeve.

2. The pneumatic drive device according to claim 1, wherein the through-hole is coaxial with the longitudinal axis of the piston.

3. The pneumatic drive device according to claim 1, wherein the first membrane and the piston are disconnected, and when the first membrane is deflected, the first membrane contacts the piston to push the piston in a longitudinal direction of the piston and towards a first side of the housing.

4. The pneumatic drive device according to claim 1, wherein the pneumatic drive device further comprises a second membrane, the second membrane being elastically stretchable or expandable, the second membrane fixedly mounted in the housing, the second membrane defining a second pressure chamber, and the second membrane being enabled to be axially deflected by pressurizing the second pressure chamber, wherein the second membrane and the piston are coupled to each other in such a way that an axial movement of the second membrane, caused by pressurizing the second pressure chamber, is converted into a translational movement of the piston along the longitudinal axis of the piston.

5. The pneumatic drive device according to claim 4, wherein the second membrane is arranged on a side of the piston opposite the first membrane.

6. The pneumatic drive device according to claim 4, wherein the second membrane and the piston are disconnected, and when the second membrane is deflected, the second membrane contacts the piston to push the piston in a longitudinal direction of the piston and towards the first membrane.

7. The pneumatic drive device according to claim 4, further comprising a second plate fixed to the housing and a second sleeve fixed to the second plate, the second membrane being disposed between the second plate and the second sleeve.

8. A pneumatic drive device for rotational movement of an actuator shaft of a medical instrument, said pneumatic drive device comprising:

(i) a housing being substantially cylindrical;

(ii) an output element mounted in the housing so as to be rotatable about a longitudinal axis of the output element, a movement of the output element being configured to be coupled to a movement of the actuator shaft;

(iii) a membrane being elastically stretchable or expandable, the membrane fixedly mounted in the housing, the membrane defining at least three pressure chambers arranged so as to be distributed in a circumferential direction, and the membrane being configured to be axially deflected in a circumferential region of the corresponding pressure chamber by pressurizing the respective pressure chamber, wherein the membrane and the output element are coupled to each other in such a way that a circumferentially section-wise oscillating axial movement of the membrane, caused by circumferentially successive pressurization and depressurization of the respective pressure chambers, is converted into a rotational movement of the output element about the longitudinal axis of the output element;

(iv) a wobble plate being arranged axially between the membrane and the output element, a wobbling movement of the wobble plate converting the circumferentially section-wise oscillating axial movement of the membrane into the rotational movement of the output element; and (v) axial pistons arranged to transmit the circumferentially section-wise oscillating axial movement of the membrane onto the wobble plate;

wherein the membrane has a substantially ring-shaped cross-section such that a through-hole axially extends through the membrane; and the pneumatic drive device further comprises an output element rod coupled to the output element, wherein the output element rod axially extends through the through-hole of the membrane.

9. The pneumatic drive device according to claim 8, wherein the through-hole is coaxial with the longitudinal axis of the output element.

10. A drive system, comprising:

(a) a first pneumatic drive device for translational movement of an actuator shaft of a medical instrument, said first pneumatic drive device comprising:

(i) a first housing being substantially cylindrical;

(ii) a piston mounted in the first housing so as to be slidable along a longitudinal axis of the piston, a movement of the piston being configured to be coupled to a movement of the actuator shaft;

(iii) a first membrane being elastically stretchable or expandable, the first membrane fixedly mounted in the first housing, the first membrane defining a first pressure chamber, the first membrane being configured to be axially deflected by pressurizing the first pressure chamber, and the first membrane having a substantially ring-shaped cross-section such that a through-hole axially extends through the first membrane;

(iv) a piston rod coupled to the piston and axially extending through the through-hole of the first membrane; and (v) a first plate fixed to the first housing and a first sleeve fixed to the first plate, the first membrane being disposed between the first plate and the first sleeve, the first membrane and the piston coupled to each other in such a way that an axial movement of the first membrane, caused by pressurizing the first pressure chamber, is converted into a translational movement of the piston along the longitudinal axis of the piston, wherein the first membrane abuts the piston and expansion of the first membrane causes the piston to move along the longitudinal axis of the piston by pushing the piston, (b) a second pneumatic drive device for rotational movement of the actuator shaft, said second pneumatic drive device comprising:

(i) a second housing being substantially cylindrical;

(ii) an output element mounted in the second housing so as to be rotatable about a longitudinal axis of the output element, a movement of the output element being configured to be coupled to a movement of the actuator shaft, the output element having an output element rod associated therewith;

(iii) a second membrane being elastically stretchable or expandable and fixedly mounted in the second housing, the second membrane defining at least three pressure chambers arranged so as to be distributed in a circumferential direction, and being configured to be axially deflected in a circumferential region of the corresponding pressure chamber by pressurizing the respective pressure chamber, wherein the second membrane and the output element are coupled to each other in such a way that a circumferentially section-wise oscillating axial movement of the second membrane, caused by circumferentially successive pressurization and depressurization of the respective pressure chambers, is converted into a rotational movement of the output element about the longitudinal axis of the output element;

(iv) a wobble plate being arranged axially between the second membrane and the output element, a wobbling movement of the wobble plate converting the circumferentially section-wise oscillating axial movement of the second membrane into the rotational movement of the output element; and (v) axial pistons arranged to transmit the circumferentially section-wise oscillating axial movement of the second membrane onto the wobble plate, wherein the first and second pneumatic drive devices share a common longitudinal axis, and wherein the piston rod and the output element rod are arranged radially nested with each other.

\* \* \* \* \*